March 14, 1967   F. SEEBER   3,309,097
AXLE ARRANGEMENT FOR CROSS COUNTRY VEHICLES
Filed Aug. 6, 1965   2 Sheets-Sheet 1

INVENTOR
Fritz SEEBER

March 14, 1967   F. SEEBER   3,309,097
AXLE ARRANGEMENT FOR CROSS COUNTRY VEHICLES
Filed Aug. 6, 1965   2 Sheets-Sheet 2

INVENTOR
FRITZ SEEBER

BY Robert H. Jacob
AGT.

United States Patent Office 3,309,097
Patented Mar. 14, 1967

3,309,097
AXLE ARRANGEMENT FOR CROSS COUNTRY VEHICLES
Fritz Seeber, Helmbach, near Elmstein, Germany, assignor to Karl Peschke, Kapitalverwaltungs-Gesellschaft Karl Peschke m.b.H., Zweibrucken, Pfalz, Germany, a firm
Filed Aug. 6, 1965, Ser. No. 477,813
2 Claims. (Cl. 280—6.11)

The present invention relates to cross country vehicles and more in particular the invention concerns an axle arrangement for cross country vehicles of the type having at least one axle which is pivotable about an axis extending in the driving direction of the vehicle. In such a vehicle the arm of the axle of each wheel has a vertically extending control arm and the control arms of both wheels are connected with one another by a rod, the center of which is pivotally journalled on the chassis of the vehicle in a vertical transverse plane, and hydraulically operated adjusting means are provided for turning the wheels relative to the axis which are steered by means of a pendulum system. Such arrangements and devices are intended to stabilize the chassis or the body of the vehicle, particularly while driving transversely or at an angle with respect to the inclines of slopes or hills.

One known arrangement of this type has the shortcoming of the pendulum system being too inert for reacting to the unevenness of the ground travelled on with sufficient rapidity because the steering pendulum is cushioned in a liquid.

On the other hand hydraulic systems are known which react practically without inertia, at least with so little inertia that the control or steering impulses can act on the control means of the vehicle without noticeable delay. This means that in response to individual shocks the vehicle would at first not react in a stabilizing sense but exactly opposite because the pendulum movements resulting from individual shocks would first cause the hydraulic system to follow the pendulum movement very rapidly. Then the pendulum would initiate the stabilizing control movement only a moment later. Thus under certain conditions a rocking movement could develop.

It is, therefore, an object of the present invention to design the pendulum system in a manner that under all conceivable conditions introduced by the terrain travelled on a control impulse will be sustained in the sense of stabilization of the vehicle.

The problem is solved in accordance with the invention on the basis of the axle arrangement described above, in that in the pendulum system, vertically above a pendulum journalled in the longitudinal axis of the vehicle, a second pendulum is provided as a counter weight and both pendulums have an arm extending at a right angle from their points of connection or linkage, while both arms have their free ends pivotally connected with each other by means of a coupling member and that the hydraulically activated adjusting device comprises two double acting pressure cylinders each of which is linked at one end to the axle and at the other end to the steering or setting arms.

Further objects and details of the invention will become apparent from the following description with reference to the embodiments illustrated in the accompanying drawings in which.

Figure 1:
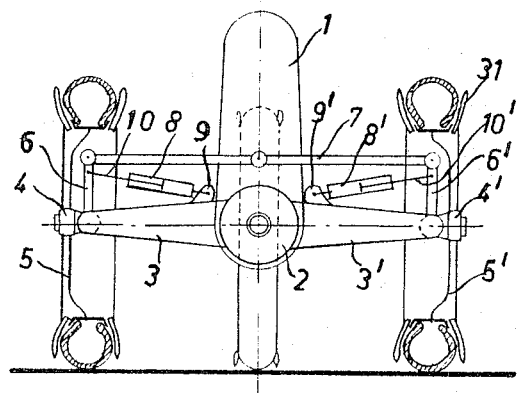
FIG. 1 illustrates schematically and partly in section the axle arrangement in accordance with the invention, while traveling on horizontal ground.

In the drawings the invention is illustrated in connection with an example of a three-wheeled vehicle. Without it being intended to limit the application of the axle arrangement to three-wheel vehicles having a rear drive axle, this illustrates the simplest embodiment of the invention. Besides a three-wheel vehicle offers certain advantages with respect to a four-wheel vehicle as far as its maneuverability is concerned.

The vehicle body 1 has connected to it a differential 2 which is pivotally movable about the longitudinal axis of the vehicle. From the differential 2 which may be driven in any desired way, the movement is transmitted by way of two half-axles, 3, 3′, and the wheel hubs 4, 4′ pivotally connected thereto, to the drive wheels 5, 5′. The vertically disposed guide arms 6, 6′ are rigidly connected to the hubs, and are in turn each connected to rod 7 which is pivotally secured to the vehicle body and extends parallel to the axles 3, 3′. The half-axles 3, 3′, the guide arms 6, 6′, and the rod 7 thus constitute a lever system which may be displaced in the manner of a parallelogram. The free ends of the half-axles 3, 3′ have connected thereto the wheels 5, 5′ by means of known link joints in a manner that the articulated axles extend each in a plane with the longitudinal axes of the guide arms 6, 6′.

For stabilizing the lever system which is not stable per se two hydraulically driven pressure cylinders 8, 8′ are preferably provided which at one end are pivotally connected by way of arms 9, 9′ with the half-axles 3, 3′ in the area of the differential 2, and whose pistons 10, 10′ are likewise pivotally connected to the upper end of the guide arms 6, 6′.

Figure 3:
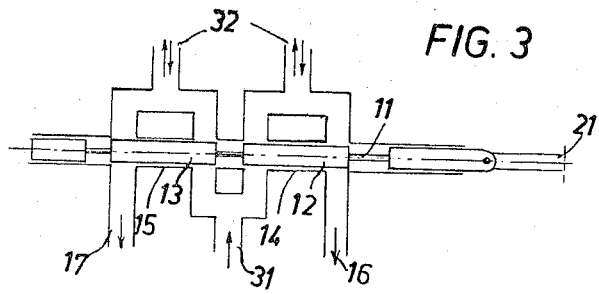
FIG. 3 is a schematic illustration of the control means of the pressure balancing cylinders.

The pressure cylinders 8, 8′ are connected to a pressure conduit in a known manner which has an oil pump connected to its circuit. FIG. 3 shows schematically the control slide valve with the supply conduit 31 from the oil pump, the two pressure conduits 32 leading to the pressure cylinders 8, 8′ which alternately serve for forward and return flow, as well as the return flow conduits 16, 17 to the oil sump from which the oil pump is supplied. The operation of this control slide valve is effected by way of a steering bar 21 and by means of a pendulum system.

Figure 4:
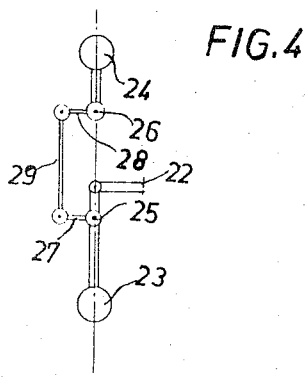
FIG. 4 shows an embodiment of the pendulum used for this purpose.

The pendulum system illustrated in FIG. 4 is the impulse initiating part of the hydraulic stabilizing device of the axle arrangement in accordance with the invention. In the pendulum system, a pendulum 23 and a counter weight 24 are suspended for rotation opposite to one another about the bolts 25, 26. The pendulum 23 hangs freely downwardly, while the counter weight 24 is provided standing in inverted position on a lever arm which is shorter in accordance with the greater distance of this weight from the contact point between the wheel and the surface of the ground. At the pivot points 25, 26 both pendulums support horizontal arms 27, 28, rigidly connected thereto in a manner to resist bending, which in turn are pivotally connected at their end points with a coupling bar 29. The connection with the control slide valve is indicated at 22.

The suspension points 25, 26 of the pendulum and the counter weight must be disposed exactly along the center axis of the vehicle and this, as far as the clearance from the ground permits, as low as possible, and in such a manner that the pendulum 23 and the counter weight 24 are free to swing transversely of the longitudinal axis of the vehicle. The connection of pendulum 23 and counter weight 24 by way of linkage 27, 28, 29 must be rigid and the journalling of the levers must be without tolerance. As the vehicle travels on a horizontal surface i.e. only under the effect of the forces of gravity the pendulum 23 always hangs plumb, while the counter weight must be plumb above its suspension point.

Figure 2:
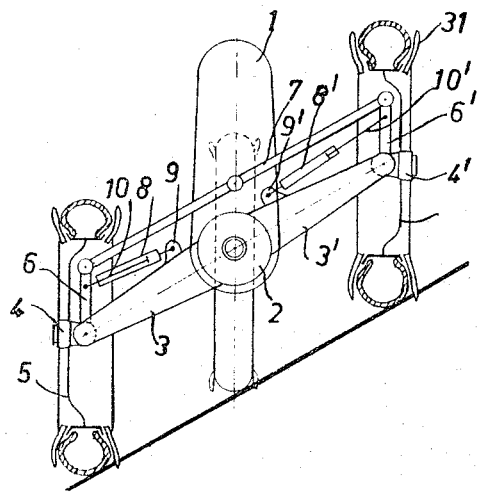
FIG. 2 illustrates the same arrangement while traveling along an inclined slope.

The pendulum system actuates the control valve (FIG. 3) as the vehicle is disposed in an oblique position i.e. during travel transversely with respect to a slope. This control valve is suitably constructed with two pistons 12, 13 arranged upon a piston rod 11 which run on both sides of cylinders 14, 15 that are provided with intake or discharge openings. These intake or discharge openings are connected to the corresponding sections of the pressure cylinders 8, 8'. With the vehicle running on an inclined plane on a slope the control valve due to actuation of the pendulum system opens the pressure fluid conduit 31 for the pressure from the oil to the same extent as it frees the other pressure conduit 16 or 17 for the return flow of the fluid. Thus, in response to suitable actuation, the oil pump applies pressure to the pistons of the cylinder 8, 8' in a manner that the vehicle body is again righted as the axle 3, 3' is disposed in an inclined position. In this righted position, the pendulum system again reaches its position of rest and again closes the pressure conduits by way of the control valve (FIG. 2). In spite of the traveling transversely of a slope inclined up to about 40°, the vehicle is maintained in vertical position. The front wheel, whose steering axle extends vertically through the center point of the wheel is forced to follow all movements of the vehicle body.

If one wheel of the vehicle encounters an obstacle while traveling over uneven terrain, the vehicle is first placed in inclined position and a lateral shock develops which is also applied to the suspension point 25 of the pendulum 23. Due to this shock, the suspension point tends to move aside along a circular arc about the point of contact with the ground wheel opposite from the obstacle. Owing to its inertia the pendulum 23 would have a tendency to avoid the shock in the wrong direction without the arrangement of a counter weight. This means that with a single hanging pendulum the inclined position of the vehicle would be amplified by such shocks. By virtue of the arrangement of the counter weight 24 which is connected with the pendulum 23 by way of a linkage this reaction to sudden shocks is eliminated. In order to achieve this, the weights of the pendulum 23, 24, as well as the length of their lever arms must be at a predetermined ratio to the level or height of their points of suspension, as well as to the track width of the vehicle.

Figure 5:
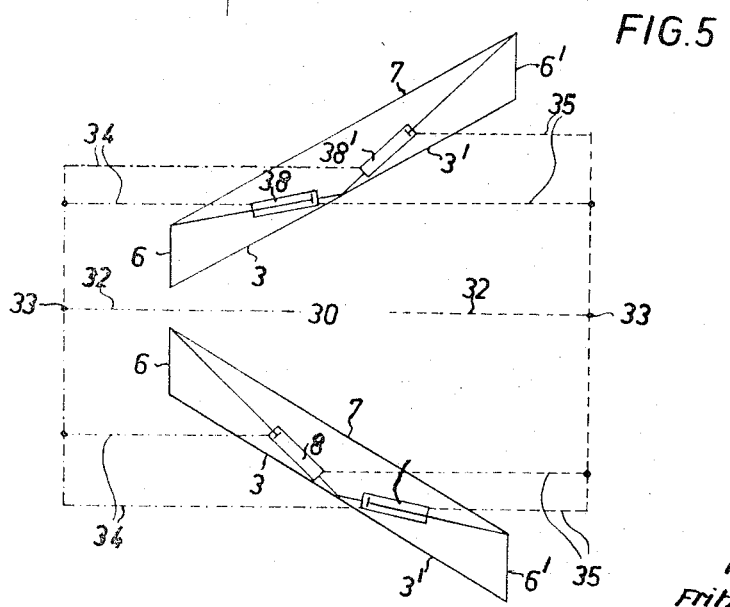
FIG. 5 is a schematic diagram of the pressure fluid conduits in a vehicle constructed with two axles in accordance with the invention.

As illustrated in FIG. 5, the arrangement of the axles in accordance with the invention may also be applied to vehicles having two axles and four wheels. The connection of the cylinders 8, 8' and 38, 38' is made in the manner illustrated where a suitable control means such as illustrated in FIG. 3 must be installed at 30.

The conduits 32 lead by way of distribution points 33 and conduits 34 or 35, with the cylinders 8 and 38, or 8' or 38' to both axles of the vehicle.

With this type of vehicle, it is therefore possible when traveling over uneven ground to have an equalization of pressure between the cylinders associated with the two axles without it being necessary for the pressure fluid to pass first through the control valve provided at 30. This type of vehicle can be constructed with a driven non-guided axle and a non-driven guided or steered axle, as well as also with two driven and steered axles.

Having now described my invention with reference to the embodiment illustrated in the drawings, I do not wish to be limited thereto, but what I desire to protect by Letters Patent is set forth in the appended claims.

I claim:

1. Axle arrangement for cross country vehicle having a longitudinal axis and of the type having at least one transverse axle pivotable about said longitudinal axis, and having at least one pair of wheels each including a hub shank and a pivot axle extending in the direction of travel, each said pivot axle supporting a wheel by its hub proximate an end of said transverse axle, each said hub shank having a guide arm extending at an angle relative to the shank, a linkage rod pivotally mounted at its mid portion on said vehicle and having opposite ends each pivotally connected to one said guide arm, hydraulic means operable to move said shanks and wheels relative to said transverse axle and a pendulum system operative to control said hydraulic means, said pendulum system comprising a first pendulum having a pivot axis parallel to and in vertical alignment with the longitudinal axis of said vehicle and a second pendulum disposed in upright position as a counter weight for said first pendulum having a pivot support above said pivot axis and said pivot support each having a rigid arm extending at a right angle therefrom, and a coupling bar pivotally connecting said rigid arms, said hydraulic means comprising two double acting cylinders each connected at one end to said transverse axle and at the other end to one said guide arm and a control valve having a fluid intake opening for each double acting cylinder, a slide member movable to open and close said openings and a rod connected to one said pendulum for moving said slide member.

2. Axle arrangement for cross country vehicle having a longitudinal axis and of the type having two transverse axles each pivotable about said longitudinal axis, each axle having a pair of wheels each including a hub shank and a pivot axle extending in the direction of travel, each said pivot axle supporting a wheel by its hub proximate an end of said transverse axle, each said hub shank having a guide arm extending at an angle relative to the shank, a linkage rod pivotally mounted at its mid portion on said vehicle and having opposite ends each pivotally connected to one said guide arm, hydraulic means operable to move said shanks and wheels relative to said transverse axle and a pendulum system operative to control said hydraulic means, said pendulum system comprising a first pendulum having a pivot axis parallel to and in vertical alignment with the longitudinal axis of said vehicle and a second pendulum disposed in upright position as a counter weight for said first pendulum having a pivot support above said pivot axis and said pivot support each having a rigid arm extending at a right angle therefrom, and a coupling bar pivotally connecting said rigid arms, said hydraulic means comprising two pairs of double acting cylinders each connected at one end to its associated transverse axle and at the other end to one said guide arm and a control valve having a fluid intake opening and a fluid discharge opening for double acting cylinders on each side of the vehicle, a slide member movable to open and close said openings and a rod connected to one said pendulum for moving said slide member, said hydraulic means including conduit means, one for each side of said vehicle, each having a fluid flow connection with the associated side of said valve and connecting the outer ends of the double acting cylinders on one side of the vehicle and the inner ends of the double acting cylinders on the opposite side of the vehicle with each other thereby bypassing said control valve for direct balancing of pressure.

References Cited by the Examiner

UNITED STATES PATENTS

| 2,625,232 | 1/1953 | Lado | 280—111 X |
| 2,967,578 | 1/1961 | Schomers | 180—41 X |

BENJAMIN HERSH, *Primary Examiner.*

P. GOODMAN, *Assistant Examiner.*